United States Patent [19]

Williams

[11] Patent Number: 4,718,868

[45] Date of Patent: Jan. 12, 1988

[54] ANNULAR COILED SPRING ELECTRICAL CONTACT

[76] Inventor: Robert A. Williams, 55 Bounty Rd. East, Fort Worth, Tex. 76116

[21] Appl. No.: 413,540

[22] Filed: Aug. 31, 1982

[51] Int. Cl.⁴ ............................................. H01R 13/11
[52] U.S. Cl. ..................... 439/840; 267/168; 285/318
[58] Field of Search ............... 339/251, 252 R, 252 S, 339/255 RT, 256 RT, 256 S; 267/168, 60; 403/326, DIG. 6, DIG. 7; 411/352, 516; 285/244, 318, 321

[56] References Cited

U.S. PATENT DOCUMENTS

| | | | |
|---|---|---|---|
| 2,176,718 | 10/1939 | Linde | 339/255 RT |
| 2,678,428 | 5/1954 | Fiet | 339/256 RT |
| 3,011,775 | 12/1961 | MacLeod | 267/168 |

FOREIGN PATENT DOCUMENTS 1425298 12/1965 France .............................. 339/256 S Primary Examiner—Joseph H. McGlynn

[57] ABSTRACT

A first coiled spring has its two ends coupled together to form an annular coiled spring. The two ends of the first coiled spring are coupled together by a second coiled spring located within the first coiled spring. One end of the second coiled spring is connected to one end of the first coiled spring and the other end of the second coiled spring is connected to the other end of the first coiled spring. A loop is formed at each end of the first coiled spring. The ends of the second spring are connected to the two loops of the first coiled spring respectively, and the loops are offset from each other such that one loop fits into one end of the first coiled spring and the other loop fits into the other end of the first coiled spring.

22 Claims, 7 Drawing Figures

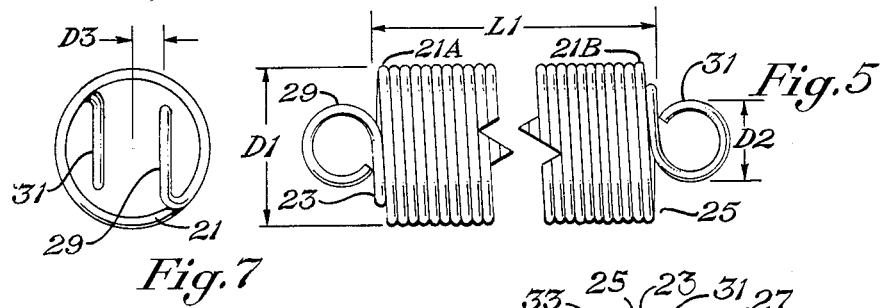
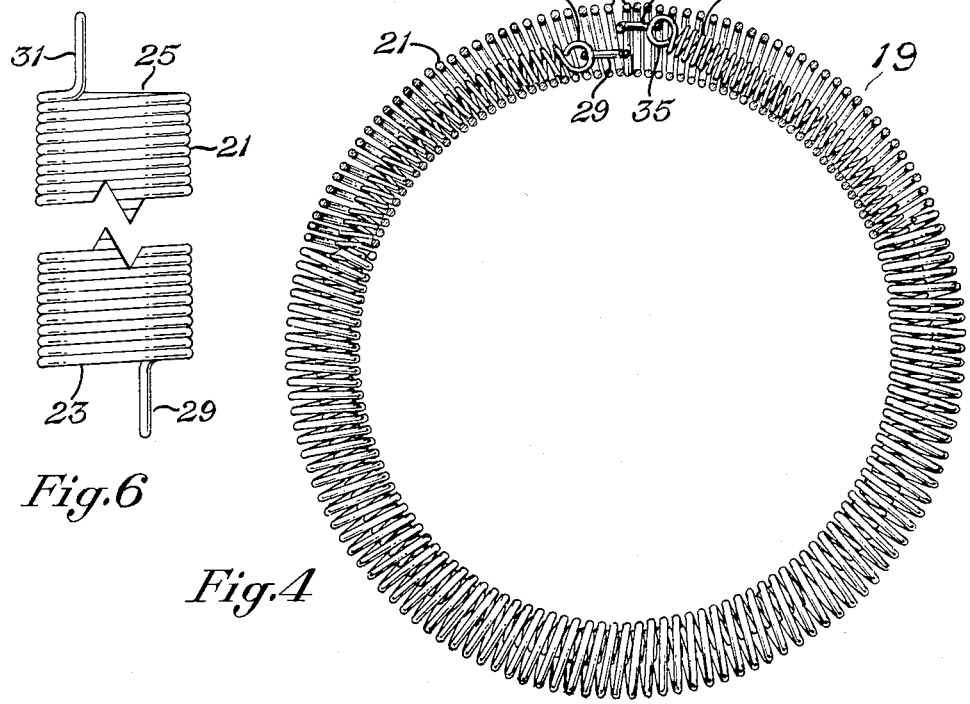
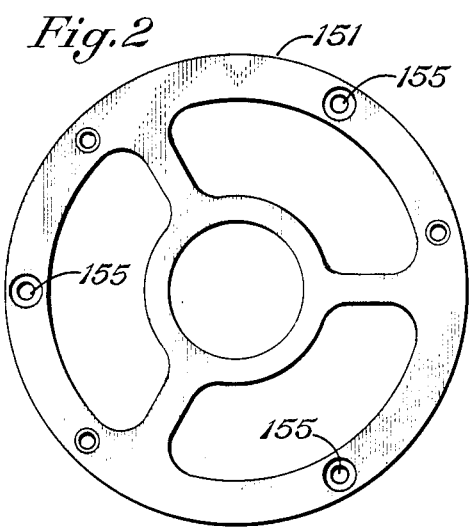
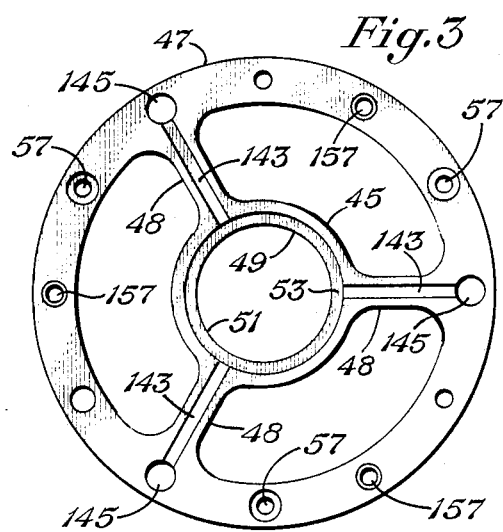

ANNULAR COILED SPRING ELECTRICAL CONTACT

SUMMARY OF THE INVENTION

It is an object of the present invention to provide a new and useful annular electrical contact formed of first and second coiled springs. The first coiled spring is formed into an annular configuration with its ends coupled together by a second coiled spring located within the first coiled spring.

In a further aspect, a loop means is formed at each end of the first coiled spring. The ends of the second coiled spring are connected to the loop means of the first coiled spring respectively and the loop means are offset from each other such that one loop means fits into one end of the first coiled spring and the other loop means fits into the other end of the first coiled spring.

The annular coiled spring electrical contact is adapted to fit around a cylindrical member of an apparatus for electrically connecting together inner and outer contacts.

BRIEF DESCRIPTION OF THE DRAWINGS

FIG. 2 is a top view of a plate component of the apparatus of FIG. 1.

FIG. 3 is a top view of a socket component of the apparatus of FIG. 1.

FIG. 4 is a side view of the annular coiled spring electrical contact of the present invention.

FIG. 5 is a partial side view of the outer coiled spring of FIG. 4 in a straight configuration showing the loop at its two ends.

FIG. 6 is a partial side view of the outer coiled spring of FIG. 4 in a straight configuration showing the loops at its two ends offset from each other.

FIG. 7 is an end view of the outer coiled spring of FIG. 4 in a straight configuration showing the loops at its two ends offset from each other.

DESCRIPTION OF THE PREFERRED EMBODIMENT

Figure 1:
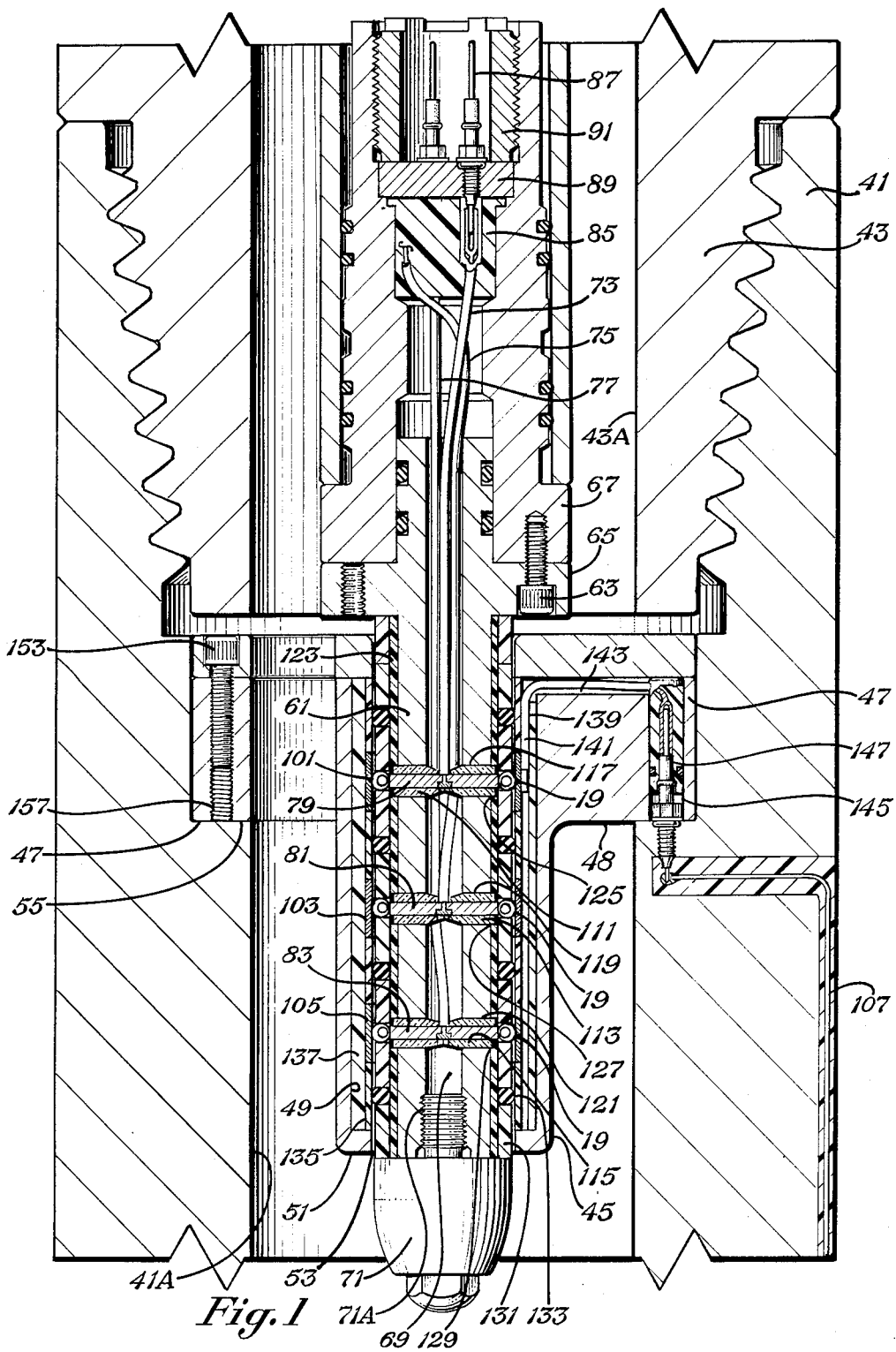
FIG. 1 is a cross-section of an apparatus employing the present invention.

Referring now to FIGS. 4-7, the annular coiled spring electrical contact of the present invention is identified at 19 and comprises an outer coiled metallic spring 21 having two ends 23 and 25 which are coupled together by an inner coiled metallic spring 27 to form the coiled spring 21 into an annular configuration. Spring 21 has a loop 29 formed at end 23 and loop 31 formed at end 25. The loops 29 and 31 project beyond the ends 23 and 25 respectively of the spring 21. The planes of the loops 29 and 31 generally are transverse to the planes of the end coils 21A and 21B of the spring 21. The outside diameters of the loops 29 and 31 are less than the inside diameters of the coils of the spring 21. As shown in FIGS. 4, 6, and 7, loops 29 and 31 are offset from each other. Spring 27 has a loop 33 formed at one end and a loop 35 formed at the other end. The outside diameter of spring 27 defined by its coils is smaller than the inside diameter of spring 21 defined by its coils.

The ends 23 and 25 of spring 21 are coupled together to form the spring 21 into an annular configuration by opening up the loop 33 of spring 27 and bending it around loop 29 of spring 21; inserting spring 27 through the coils of spring 21; and bending the loop 35 of spring 27 around the loop 31 of spring 21. Thus as can be understood, the annular coiled spring electrical contact is easy to produce. Since the outside diameters of loops 29 and 31 are smaller than the inside diameters of the coils of spring 21 and since the planes of the loops 29 and 31 are offset from each other, loop 29 fits into the coils of spring 21 at end 25 and loop 31 fits into the coils of spring 21 at end 23. Thus the coils 21A and 21B at the ends 23 and 25 respectively of spring 21 essentially abut each other such that there is practically no gap in the spring 21 where its ends 23 and 25 are coupled together. In addition, since the ends of the spring 21 are not welded together, each coil of the spring 21 has the same properties. Moreover, since the loops 29 and 31 of the spring 21 are located inside of the coils of the spring 21, the ends of the spring 21 in effect are guarded against unwinding.

Referring now to FIG. 13, there will be described an apparatus in which the annular coiled spring electrical contact of the present invention may be employed. The apparatus in FIG. 1 is a portion of a logging-while-drilling tool adapted to be inserted into a borehole while it is being drilled into the earth. Reference numbers 41 and 43 identify sections of the wall of the tool which are screwed together. Sections 41 and 43 have central apertures 41A and 43A formed therethrough respectively. Mounted in the aperture 41A of Section 41 is a socket 45 having at its upper end an outer ring 47 connected to the socket 45 by way of three spaced apart spoke members 48. A cylindrical shaped central aperture 49 extends from the upper end of the socket 45 to an inward extending wall 51 having a smaller opening 53 formed therethrough. The outer ring 47 is seated on shoulder 55 of section 41 and is secured to section 41 by way of bolts (not shown) screwed through holes 57 in the ring 47 and into corresponding threaded holes (not shown) formed in section 41. A cylindrical shaped stem 61 is located in central aperture 49 of the socket 45. The upper end of the stem 61 has a flange 63 which is connected by way of bolts 65 to structural member 67 of the apparatus. The stem 61 has a central aperture 69 formed therethrough. A lower plug 71 has a threaded portion 71A which is screwed into threads formed in the lower end of the stem 61.

Three electrical leads 73, 75, and 77 extend through the central aperture 69 of the stem to three electrical contacts 79, 81, and 83 respectively supported by the stem. The three leads 73, 75, and 77 extend upward through insulating material 85 and are connected respectively to three electrical pin terminals 87 (only two of which are shown) supported by member 89 which is held in the structural member 67 by threaded member 91. Electrical leads (not shown) are connected to terminals 87 and extend upward to other electrical apparatus.

Three annular coiled spring electrical contacts 19 are employed to provide electrical connection between the three contacts 79, 81, and 83 and three annular metal ring contacts 101, 103, and 105 respectively. The three ring contacts, 101, 103, and 105 are connected to three electrical leads 107 respectively (only one of which is shown) which are connected to an induction coil (not shown) for example for making certain measurements while drilling operations are being carried out.

The contacts 79, 81, and 83 are rod shaped metallic members located in electrical insulating members 111, 113, and 115 which are supported in apertures 117, 119, and 121 respectively that extend transversely through the stem 61. A hollow cylindrical shaped electrical insulator 123 is located around the stem 61. The insulator 123 has apertures 125, 127, and 129 formed therethrough in alignment with apertures 117, 119, and 121 respectively for receiving the contacts 79, 81, and 83 and insulating members 111, 113, and 115. The ends of the rod shaped contacts 79, 81, and 83 project slightly beyond the outer surface of the insulator 123 such that the coils 21 of contacts 119 may engage the ends of the rod shaped contacts 79, 81, and 83 respectively. Located above and below the annular contacts 19 are a plurality of hollow cylindrical shaped insulators 131 and elastomer O-rings 133 located around the insulator 123. The lower insulator 131 is supported by the plug 71. Going upward from the lowest insulator 131, the sequence is as follows: O-ring 133, insulator 131, annular contact 19, insulator 131, O-ring 133, insulator 131, annular contact 19, isulator 131, O-ring 133, insulator 131, annular contact 19, insulator 131, O-ring 133, insulator 131, and insulator 131. Located above and below the hollow cylindrical shaped contacts 101, 103, and 105 are hollow cylindrical shaped insulators 135. The lowest insulator 135 is supported by the inward extending wall 51. Going upward from the lowest insulator 135, the sequence is as follows: contact 105, insulator 135, contact 103, insulator 135, contact 101, and insulator 135.

Located around the contacts 101, 103, and 105 and around the insulators 135 is an elongated hollow cylindrical shaped insulator 137 having three slots 139 (only one of which is shown) spaced 120° apart formed in the inside wall along the length of the insulator. The purpose of the slots 139 is to provide space for electrical leads connected to the contacts 101, 103, and 105.

In FIG. 1, one electrical lead 141 is shown connected to the outside wall of contact 101. Formed in the top of the spoke member 48 are three slots 143 respectively which extend from annular aperture 49 to three apertures 145, respectively. The three electrical leads connected to contacts 101, 103, and 105, extend through the three slots 143 to the apertures 145 where they are connected to terminals, which in turn are connected to the three electrical leads 107 respectively. In FIG. 1, terminal 147 located in one aperture 145 is shown connecting lead 141 to lead 107.

A plate 151 is connected to the top of the socket 45 by way of bolts 153 which are screwed through holes 155 formed in plate 151 and into holes 157 formed in socket 45.

The springs 19 not only have the advantages as mentioned above but also have the advantages of being able to lock the ring contacts 101, 103, and 105 to the rod contacts 79, 81, and 83 respectively during assembly of the apparatus of FIG. 1. In this respect, with the ring contacts 101, 103, and 105 located around the spring contacts 19 and before the stem 61 is located in aperture 49 of the socket 45, the ring contacts 101, 103, and 105 may be rotated about the axis of the stem 61 to cant the coils of springs 21 of contacts 19 thereby locking the ring contacts 101, 103, and 105 in place as can be understood from the description of my copending U.S. patent application Ser. No. 125,161, filed Feb. 27, 1980, and entitled "SELF-LOCKING MEANS."

Referring to FIGS. 4–7, in one embodiment, the outside diameter D1 of spring 21 is about 0.123 of an inch. The length L1 of spring 21 is about 2.7 inches. The dimension D2 is 0.060 of an inch. The dimension D3 is 0.030 of an inch. The outside diameter of the coils of spring 27 is 0.062 of an inch and the length of spring 27 between its ends from which the loop 33 and 35 project, is 2.20 inches.

I claim:

1. An annular spring, comprising:
a first coiled spring having two ends, and
a second coiled spring located within said first coiled spring and having two ends,
one end of said second coiled spring being connected to one end of said first coiled spring and the other end of said second coiled spring being connected to the other end of said first coiled spring such that said first coiled spring is formed to an annular configuration with its two ends coupled together and said second coiled spring forms a generally annular configuration within said first coiled spring.

2. The annular spring of claim 1, comprising:
a loop means formed at each end of said first coiled spring,
one end of said second coiled spring being connected to one of said loop means and the other end of said second coil spring being connected to the other of said loop means,
said two loop means being offset from each other such that when the two ends of said first coiled spring are coupled together, the loop means at said one end of said first coiled spring fits into said other end of said first coiled spring and the loop means at said other end of said first coiled spring fits into said one end of said first coiled spring.

3. The annular spring of claims 1 or 2 wherein said first coiled spring comprises a metallic coiled spring forming an annular coiled spring electrical contact.

4. An apparatus, comprising:
a cylindrical shaped inner means supporting an inner electrical contact such that at least a portion of said inner electrical contact is at the periphery of said cylindrical shaped inner means,
a first coiled metallic spring located around said cylindrical shaped inner means at a position to engage said portion of said inner electrical contact,
an outer electrical contact located at a position to engage said first coiled metallic spring whereby said first coiled metallic spring provides an electrical connection between said inner and outer electrical contacts,
said first coiled metallic spring having two ends,
a second coiled spring located within said first coiled spring and having two ends,
one end of said second coiled spring being connected to one end of said first coiled spring and the other end of said second coiled spring being connected to the other end of said first coiled spring such that said first coiled spring is formed to an annular configuration with its two ends coupled together and said second coiled spring forms a generally annular configuration within said first coiled spring.

5. The apparatus of claim 4, comprising:
a loop means formed at each end of said first coiled spring,
one end of said second coiled spring being connected to one of said loop means and the other end of said second coil spring being connected to the other of said loop means,
said two loop means being offset from each other such that when the two ends of said first coiled spring are coupled together, the loop means at said one end of said first coiled spring fits into said other end of said first coiled spring and the loop means at said other end of said first coiled spring fits into said one end of said first coiled spring.

6. The annular spring of claim 1, wherein:
the outside diameter of said coils of said second coiled spring is smaller than the inside diameter of said coils of said first coiled spring such that said coils of said second coiled spring do not prevent extension of said first coiled spring.

7. The annular spring of claim 6, comprising:
a connecting means formed at each end of said first coiled spring,
one end of said second coiled spring being connected to one of said connecting means and the other end of said second coiled spring being connected to the other of said connecting means,
when said two ends of said first coiled springs are coupled together, said connecting means at said one end of said first coiled spring fits into said other end of said first coiled spring and said connecting means at said other end of said first coiled spring fits into said one end of said first coiled spring.

8. The annular spring of claims 6 or 7, wherein:
said first coiled spring comprises a metallic coiled spring forming an annular coiled spring electrical contact.

9. The annular spring of claim 1, wherein:
the outside diameter of said coils of said second coiled spring is smaller than the inside diameter of said coils of said first coiled spring such that when said second coiled spring is located concentrically within said first coiled spring, the outer portions of said coils of said second coiled spring do not engage the inner portions of said coils of said first coiled spring.

10. The annular spring of claim 9, comprising:
a connecting means formed at each end of said first coiled spring,
one end of said second coil spring being connected to one of said connecting means and the other end of said second coiled spring being connected to the other of said connecting means,
when said two ends of said first coiled spring are coupled together, said connecting means at said one end of said first coiled spring fits into said other end of said first coiled spring and said connecting means at said other end of said first coiled spring fits into said one end of said first coiled spring.

11. The annular spring of claims 9 or 10, wherein:
said first coiled spring comprises a metallic coiled spring forming an annular coiled spring electrical contact.

12. A spring apparatus, comprising:
a first coiled spring having two ends,
said first coiled spring being formed by coils forming a hollow spring member,
a second coiled spring having two ends,
said second coiled spring being located within the coils of said first coiled spring,
one end of said second coiled spring being connected to one end of said first coiled spring and the other end of said second coiled spring being connected to the other end of said first coiled spring such that said first coiled spring has its two ends coupled together and forms a configuration surrounding a central opening,
said second coiled spring from its said one end extends on the inside of the coils of said first coiled spring to its said other end such that said second coiled spring forms a configuration within the coils of said first coiled spring which is similar to the configuration formed by said first coiled spring.

13. The spring apparatus of claim 12, wherein:
the outside diameter of said coils of said second coiled spring is smaller than the inside diameter of said coils of said first coiled spring such that said coils of said second coiled spring do not prevent extension of said first coiled spring.

14. The spring apparatus of claim 12, wherein:
the outside diameter of said coils of said second coiled spring is smaller than the inside diameter of said coils of said first coiled spring such that when said second coiled spring is located concentrically within said first coiled spring, the outer portions of said coils of said second coiled spring do not engage the inner portions of said coils of said first coiled spring.

15. The spring apparatus of claims 12, 13, or 14, comprising:
a connecting means formed at each end of said first coiled spring,
one end of said second coiled spring being connected to one of said connecting means and the other end of said second coiled spring being connected to the other of said connecting means,
when said two ends of said first coiled springs are coupled together, said connecting means at said one end of said first coiled spring fits into said other end of said first coiled spring and said connecting means at said other end of said first coiled spring fits into said one end of said first coiled spring.

16. The spring apparatus of claims 12, 13, or 14, wherein:
said first coiled spring comprises a metallic coiled spring forming a coiled spring electrical contact.

17. The spring apparatus of claims 12, 13, or 14, comprising:
a connecting means formed at each end of said first coiled spring,
one end of said second coiled spring being connected to one of said connecting means and the other end of said second coiled spring being connected to the other of said connecting means,
when said two ends of said first coiled springs are coupled together, said connecting means at said one end of said first coiled spring fits into said other end of said first coiled spring and said connecting means at said other end of said first coiled spring fits into said one end of said first coiled spring,
said first coiled spring comprises a metallic coiled spring forming a coiled spring electrical contact.

18. The spring apparatus of claims 12, 13, or 14, comprising:
a loop means formed at each end of said first coil spring,
one end of said second coiled spring being connected to one of said loop means and the other end of said second coil spring being connected to the other of said loop means,
said two loop means being offset from each other such that when the two ends of said first coiled spring are coupled together, the loop means at said one end of said first coiled spring fits into said other end of said first coiled spring and the loop means at said other end of said first coiled spring fits into said one end of said first coiled spring, said configuration formed by said first coiled spring comprises an annular configuration, said first coiled spring comprises a metallic coiled spring forming an annular coiled spring electrical contact.

19. A spring apparatus, comprising:

a first coiled spring having two ends, said first coiled spring being defined by coils forming an elongated spring member having an interior space within its coils between its said two ends, a second spring having two ends, said second spring being located in said interior space within the coils of said first coiled spring, one end of said second spring being connected to one end of said first coiled spring and the other end of said second spring being connected to the other end of said first coiled spring such that said first coiled spring has its two ends coupled together and forms a configuration surrounding a central opening, said second spring from its said one end extends in said interior space of said first coiled spring along substantially the entire length of said interior space of said first coiled spring to its said other end.

20. The spring apparatus of claim 19, wherein:

said second spring has dimensions transverse to its length such that said second spring does not prevent extension of said first coiled spring.

21. The spring apparatus of claim 19, comprising:

a connecting means formed at each end of said first coiled spring, one end of said second spring being connected to one of said connecting means and the other end of said second spring being connected to the other of said connecting means, when said two ends of said first coiled springs are coupled together, said connecting means at said one end of said first coiled spring fits into said other end of said first coiled spring and said connecting means at said other end of said first coiled spring fits into said one end of said first coiled spring.

22. The spring apparatus of claim 19, comprising:

a loop means formed at each end of said first coiled spring, one end of said second spring being connected to one of said loop means and the other end of said second spring being connected to the other of said loop means, said two loop means being offset from each other such that when said two ends of said first coiled spring are coupled together, the loop means at said one end of said first coiled spring fits into said other end of said first coiled spring and the loop means at said other end of said first coiled spring fits into said one end of said first coiled spring.

* * * * *